United States Patent [19]

Lapham

[11] 4,395,060
[45] Jul. 26, 1983

[54] PORTABLE, REUSABLE PIPE COUPLING

[76] Inventor: Edward L. Lapham, 13219 Pine Dr., Cypress, Tex. 77429

[21] Appl. No.: 236,232

[22] Filed: Feb. 20, 1981

[51] Int. Cl.³ .............................................. F16L 35/00
[52] U.S. Cl. ..................................... 285/39; 285/231; 285/356; 285/369
[58] Field of Search ............... 285/356, 346, 369, 342, 285/338, 39, 231; 277/110, 111, 112

[56] References Cited

U.S. PATENT DOCUMENTS

| 710,631 | 10/1902 | Tietz | 285/346 X |
|---|---|---|---|
| 1,082,324 | 12/1913 | Hart | 285/379 |
| 1,869,915 | 8/1932 | Sample | 285/356 X |
| 1,925,406 | 9/1933 | Shaffer | 285/356 X |
| 1,974,195 | 9/1934 | Rice | 285/356 X |
| 2,272,222 | 2/1942 | Mullen | 285/356 X |
| 2,568,232 | 9/1951 | Hamer | 285/39 |
| 2,703,719 | 3/1955 | Crothers | 277/110 |
| 3,430,990 | 3/1969 | Nelson | 285/346 X |

Primary Examiner—Dave W. Arola
Attorney, Agent, or Firm—Gunn, Lee & Jackson

[57] ABSTRACT

A portable, reusable pipe coupling for connecting joints of cylindrical conduit which incorporates an annular body structure having sealed recesses formed at each extremity thereof. The end portions of the body structure define annular enlargements that are internally threaded and receive the externally threaded annular rim portion of a seal retainer element at each extremity of the coupling. The seal retainer element cooperates with a seal support member within the coupling body to define an annular seal chamber and an annular seal locking groove. An annular sealing element formed of resilient material is disposed within the seal chamber and is deformed by movement of the seal retainer relative to the coupling body, thus forcing the inner peripheral portion of the sealing element into sealed engagement with the ends of conduit sections that are located within the coupling body. The sealing element also incorporates an annular locking flange that is secured within the locking groove. The seal retainer is provided with hammer lugs to allow rotatable adjustment by application of hammer blows to the seal retainer. The coupling body includes a carrying handle to facilitate transporting the coupling when not in use.

11 Claims, 2 Drawing Figures

PORTABLE, REUSABLE PIPE COUPLING

FIELD OF THE INVENTION

This invention relates generally to pipe coupling structures and more specifically relates to a portable, reusable pipe coupling such as is usable under circumstances where conduit sections are frequently assembled and disassembled.

BACKGROUND OF THE INVENTION

In many commercial environments, it is necessary to interconnect pipe or conduit sections for temporary use, which conduit sections are subsequently disassembled, moved to another location and reassembled. Under such circumstances, it is desirable to provide means for simply and quickly interconnecting pipe or conduit sections by means of couplings that can be reused a number of times. One example of such use of pipe and pipe couplings is in the petroleum industry for the drilling of wells. Fairly large diameter conduit is typically utilized as the return line transporting drilling fluid or mud exiting from the well to suitable facilities for treating the drilling mud prior to its reuse. Such mud return lines are typically at relatively low pressure, i.e. less than 100 psi, and thus it is not necessary that a high pressure joint be established between the conduit sections. The flow lines that make up a mud return line of a typical drilling rig include a number of straight pipe sections which may be coupled together or may be coupled by 45° or 90° elbows. These mud return lines extend from the well drilling Christmas tree assembly to a shale separator utilizing viboratory screens that separate drill cuttings from the drilling fluid. The drilling fluid may then be subjected to a degree of centrifugal separation before being transported to mud storage and treatment pits for storage until reuse is desired. Further, in many cases, the mud pits of drilling rigs are formed by large metal vat structures, two or three or more of which are interconnected by means of sections of fairly large diameter conduit. In these mud pits, the drilling fluid is treated by means of gravity separation or settling such that drilling fluid at the last one of the pits is in cleaned and revitalized condition and ready for pumping into the well during drilling operations. Typically, additional additive materials are introduced into the drilling mud in the last pit to replace lost constituents of the drilling fluid and to accomplish any desired modifications that are appropriate to the drilling conditions that are presently being encountered.

When a drilling rig is being set up for the purpose of drilling one or more wells, the commercial advantage of the drilling operation is enhanced by any mechanism that assures minimal setup time. Likewise, the effective cost of well drilling operations is minimized if the various components of the well drilling system can be disassembled with minimal delay and effort after the well drilling operations have been concluded. It is desirable, therefore, to provide a coupling mechanism for insuring the assembly and disassembly of conduit sections with minimal labor and minimal requirement for the use of tools in the assembly or disassembly activities.

Another important consideration where pipe systems and pipe couplings are frequently assembled and disassembled, is the requirement for coupling mechanisms that incorporate minimal numbers of parts and further incorporate parts that may be assembled and disassembled a number of times without substantial deterioration. Also, it is desirable to provide pipe couplings that are assembled such that the various parts thereof cannot become inadvertently disassembled and lost as the couplings are being moved from place to place.

THE PRIOR ART

Especially in the irrigation industry, pipe couplings have been developed that may be assembled and disassembled a number of times without excessive wear. In many cases, pipe couplings of this nature employ compression joints incorporating elastomeric seal members that are mechanically compressed and deformed to establish a positive fluid tight seal between the pipe and the pipe coupling. One example of this type of coupling is set forth in U.S. Pat. No. 3,865,410 of Chen. Compression type couplings are also disclosed in U.S. Pat. Nos. 2,021,745, Pfefferle, et al; 3.188,122, Smith; and 3,578,805, Dutton. In some cases, mechanical compression seal type couplings are secured in assembly by means of bolts such as disclosed in U.S. Pat. Nos. 3,078,332, Marx; 3,547,471, Dunmire; and 3,740,082, Schustack.

SUMMARY OF THE INVENTION

It is a primary feature of this invention to provide a novel portable, reusable coupling for connecting joints of conduit wherein the coupling employs a compression type elastomeric seal.

It is also a feature of this invention to provide a novel coupling structure which may be assembled and disassembled through the use of a simple striking tool such as a hammer.

It is an even further feature of this invention to provide a novel portable, reusable coupling structure which is provided with a handle in order to render the coupling portable.

Among the several features of this invention is contemplated the provision of a novel coupling structure incorporating an annular resilient seal that is mechanically interlocked with the coupling mechanism upon assembly, thus precluding the seal from being displaced by pressure within the conduit.

It is an even further feature of this invention to provide a novel coupling structure that is retained in assembly to prevent the parts thereof from becoming inadvertently separated and lost during handling.

It is also a feature of this invention to provide a novel portable, reusable coupling structure that is of simple nature incorporating a minimum number of parts, is reliable in use and low in cost.

Other and further features, advantages and objects of the present invention will become apparent to one skilled in the art upon full consideration of the present disclosure. The form of this invention, which will now be described in detail, illustrates the general principles of the invention, but it is to be understood that this detailed description is not to be taken as limiting the scope of the present invention.

In one suitable form, the invention involves the provision of a coupling mechanism incorporating a coupling body having an elongated generally cylindrical form, defining an internal cylindrical passage that is of larger diameter than the extremities of pipe joints received therein. At each extremity of the coupling body is defined annular enlargements which are internally threaded in order to receive within an externally threaded annular rim portion of a seal retainer element.

The coupling body is also formed within each extremity thereof so as to receive annular seal support members that cooperate with the seal retainer structure to define annular seal chambers at each extremity of the coupling. The retainers, coupling body and seal support members also cooperate to define annular seal locking grooves. Elastomeric sealing elements are provided at each extremity of the coupling and are retained within the seal chambers. The seal members are of annular form and include an annular deformable body mass that is capable of being deformed as the volume of the seal chamber is diminished by assembly of the retainer element to the coupling body structure. The resilient sealing element also incorporates an annular radially outwardly extending locking portion that is received within respective ones of the annular locking grooves. The retainer element also functions in cooperation with the coupling body and seal support member to mechanically lock the locking portion of the seal member within the annular seal groove to prevent displacement of the seal upon application of pressure to the assembled pipe and coupling. The seal member is further formed to define an annular end portion that is of curved cross-sectional configuration and which is positioned in mating relation with a similarly curved internal annular surface that is defined by the retainer member. For ease of assembly and disassembly, the retainer element of the coupling structure is provided with a plurality of hammer lugs, thus enabling the seal retainer of the coupling to be assembled and disassembled simply through the use of a hammer or other striking implement to apply impact forces to the seal retainer and rotate it in the appropriate direction for assembly or disassembly. The coupling body structure is also formed to define a carrying handle by which the coupling may be transported by workers involved in the assembly or disassembly of a conduit system.

BRIEF DESCRIPTION OF THE DRAWINGS

So that the manner in which the above recited features, advantages and objects of the invention, as well as others, which will become apparent, are attained and can be understood in detail, a more particular description of the invention, briefly summarized above, may be had by reference to the embodiment thereof illustrated in the appended drawings, which drawings form a part of this specification.

It is to be noted, however, that the appended drawings illustrate only a typical embodiment of the invention and are not to be considered limiting of its scope, for the invention may admit to other equally effective embodiments.

In the Drawings:

Figure 1:
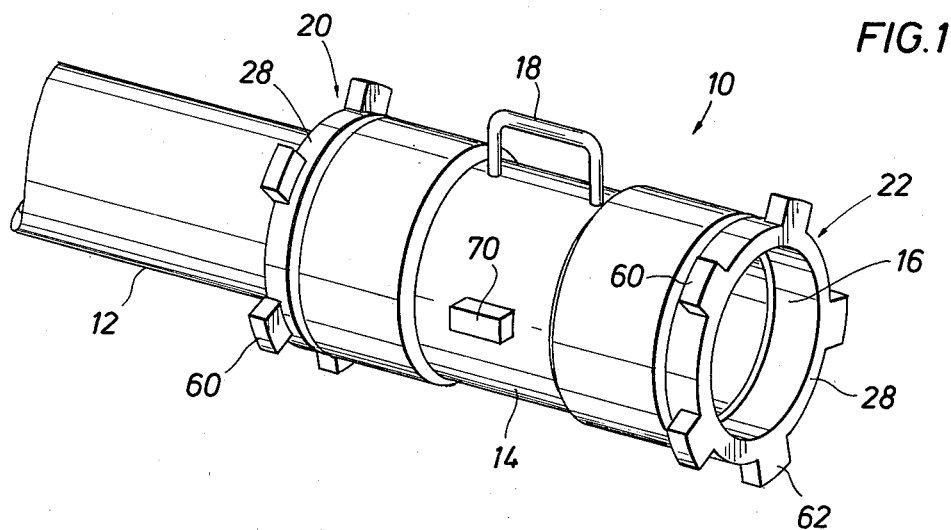
Figure 2:
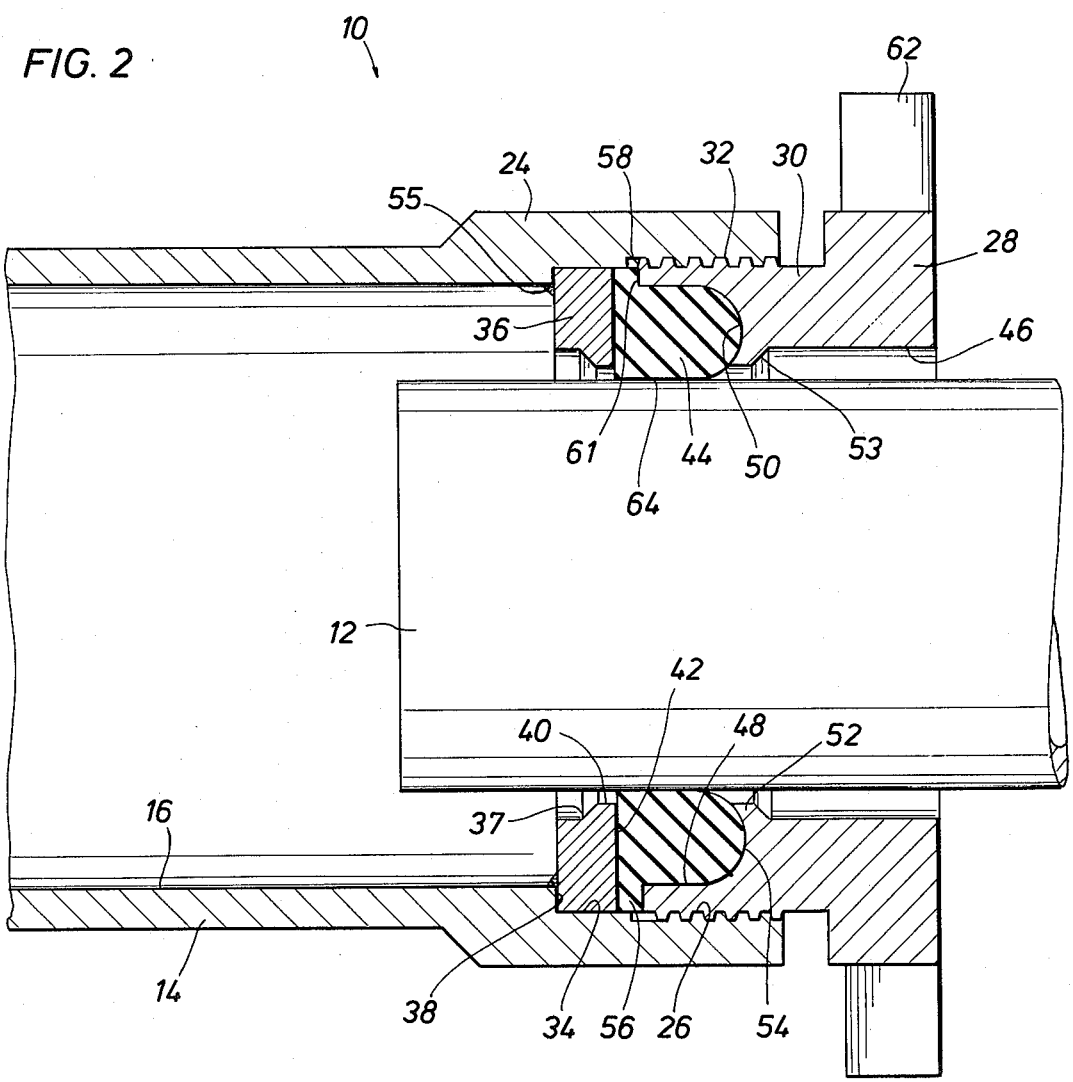

FIG. 1 is an isometric view of a coupling constructed in accordance with the present invention, illustrating one extremity thereof in assembly with a section of pipe; and FIG. 2 is a cross-sectional view of a portion of the coupling mechanism of FIG. 1, illustrating the seal, seal support and seal retainer elements at one extremity thereof and illustrating an end portion of a section of conduit being positioned therein.

DETAILED DESCRIPTION OF PREFERRED EMBODIMENT

Referring now to the drawings and first to FIG. 1, a portable, reusable coupling manufactured in accordance with this invention is illustrated generally at 10 and is illustrated with an end portion 12 of a conduit section in assembly with one extremity thereof. The coupling 10 includes a generally cylindrical body structure 14 which defines a generally cylindrical internal passage 16 through which fluid is allowed to flow and within which extremities of conduit sections are received in sealed relationship. A carrying handle 18 is secured to the outer portion of the body structure 14 thus facilitating portability of the coupling structure when it is not in use.

The coupling mechanism 10 is provided with generally identical compression seal mechanisms illustrated generally at 20 and 22, one being located at each extremity of the coupling body 14. The structure of compression seal mechanism 22 is illustrated in detail in FIG. 2.

The coupling body structure 14 is provided with annular enlargements 24 at each extremity thereof which are formed to define internal threads 26. An annular seal retainer element 28 is formed to define an annular axially extending connection rim 30 having external threads 32 that receive the internally threaded portion 26 of the enlarged connection portion of the coupling body.

The enlarged portion 24 of the coupling body is formed internally to define an annular receptacle 34 within which is received a circular seal support member 36. The receptacle 34 is formed by an internal enlargement that defines an annular abutment shoulder 38 that provides support for the seal support member 36. The seal support member defines an internal opening 40 through which the pipe 12 is extended in the manner illustrated in FIG. 2. The seal support member 36 is of generally flat, washer-like form defining an annular generally planar support surface 42 that provides support for a circular seal element 44 which establishes a seal between the coupling and the pipe. The circular seal 44 is composed of elastomeric sealing material such as rubber, synthetic rubber or any one of a number of suitable synthetic resilient materials.

The retainer member 28 is also of annular form and defines an opening or passage 46 of sufficiently large diameter to receive the pipe 12 therethrough. The retainer member is also formed internally so as to define an annular internal seal recess 48 within which the sealing member 44 is received. The seal recess is formed to define a rounded or curved seal support surface 50 that terminates at a reduced diameter internal flange portion 52 of the retainer member. The seal support surface 50 provides efficient support for a rounded or curved extremity 54 of the sealing member 44. As the retainer member 28 is rotated, causing the threaded engagement thereof with the internal threads 26 of the coupling body, the curved seal support surface 50 applies mechanical force against the rounded extremity 54 of the sealing member. The curved seal support surface functions in cam-like manner under such circumstances and induces radially inwardly directed movement of the rounded extremity 54 of the seal member, thus driving it into sealed engagement with the outer peripheral surface of the pipe 12.

When temporary conduit systems are installed, such as during assembly of well drilling rig systems, it is not always practical to accurately align adjacent joints of pipe. It is desirable, therefore, that the couplings of such temporary conduit systems be capable of accommodating a substantial amount of pipe misalignment and yet be capable of maintaining optimal sealing capability. In accordance with the present invention, as shown in detail in FIG. 2, the seal support member 36 is cut away as shown at 37 thereby causing the circular opening surface 40 to be of limited axial length. Likewise, the retainer member 28 is cut away internally thereof as shown at 53, causing the annular supporting flange 52 to be of limited axial length. Since surfaces 40 and 52 are of limited length and the adjacent portions of the seal support and retainer are relieved, the pipe 12 may have several degrees of misalignment with respect to the center-line of the coupling body 14 and yet the sealing member 44 is sufficiently deformable as to accommodate such angular pipe positioning and develop an efficient seal. For example, the pipe coupling mechanism of this invention will readily accommodate seven (7°) degrees of angular misalignment in any particular direction and yet sealing member 44 will provide an efficient seal upon tightening of the retainer element 28.

It is desirable to provide a mechanically interlocked relationship between the annular seal member 44 and the metal structural components of the coupling assembly in order to prevent pressure displacement of the seal in the event relatively high pressure conditions are encountered. In order to provide for this mechanically interlocked relationship, the coupling apparatus of this invention may conveniently take the form illustrated in FIG. 2 where the seal member 44 is formed to define an external locking flange portion 56. The free extremity of the annular connection rim portion 30 of the retainer member is formed to define an annular, tapered locking shoulder surface 58 that defines an annular lip 60 of acute angular relationship which engages the sealing member 44 at the juncture of the locking flange portion 56 and the outer peripheral portion of the sealing member 44. The end shoulder surface 58 is driven mechanically into locking engagement with the locking flange 56 of the sealing member as the retainer member 38 is rotated counter-clockwise. This locking arrangement establishes a mechanically interlocking relationship that retains the seal member 44 against pressure induced extrusion or displacement from the seal recess 48. This mechanical locking arrangement also provides the seal assembly of the coupling with the capability of withstanding significantly higher pressure as compared to other similar compression seal type pipe couplings.

Especially when the coupling of this invention is utilized in conjunction with the drilling of oil and gas wells, it is desirable to provide the coupling mechanism with the capability of being quickly assembled and disassembled, thus providing a labor saving capability. In order to facilitate ease of assembly and to also facilitate assembly of the coupling mechanism through the use of readily available tools, the seal retainer element 28 is provided with a plurality of hammer lugs 62 that may be struck by a hammer or other suitable implement in order to impart forcible rotation to the seal retainer. Assembly or disassembly of the coupling mechanism may be readily accomplished with a hammer or other striking tool which is typically readily available in a working environment where such couplings might be utilized. As the retainer flange 28 is rotated during assembly of the coupling to conduit sections, the annular sealing element 44 is compressed linearly as the retainer member moves linearly because of its threaded relationship with the internally threaded end portion 24 of the coupling body. Since the seal support member 36 restrains axial movement of the seal member 44 at one extremity thereof, continued linear or axial movement of the curved seal support surface 50 responsive to rotation of the retainer member, causes linear deformation of the sealing member. Since the sealing member is supported at its outer periphery, the elastomeric material from which it is composed, is displaced or "flows" toward the inner peripheral portion of the sealing member, thus forcing the inner peripheral portion 64 thereof to become smaller. The inner peripheral portion 64 is in fact deformed to such extent that it moves into fluid tight sealing engagement with the outer peripheral portion of the pipe 12. Since the seal support surface 50 is of curved configuration, it functions in concert with the rounded end portion 54 of the sealing member to create a cam-like function. This cam-like function urges the rounded end portion of the sealing element in radially inwardly directed manner, thereby achieving efficient sealing between the seal member and the outer peripheral surface of the pipe. By virtue of the rounded seal support surface 50, the sealing capability of the sealing member can be very efficiently controlled, thus achieving light mechanical sealing under limited application of squeezing force to the seal member. The retainer member 28 may also be forced into sufficiently great seal forcing relationship with the sealing member 44 that relatively high pressure sealing will be induced between the sealing member and the pipe. The retainer element 28 is tightened sufficiently to achieve the desired characteristics of sealing simply by striking the hammer lugs 62 with a hammer or other suitable implement sufficiently to rotate it as tightly as desired. In the event leakage occurs during service, the sealing capability of the sealing member may be enhanced simply by further clockwise rotation of the retainer member by means of a hammer or other implement that might be readily available. Disassembly of the coupling is achieved in reverse manner by counter-rotating the retainer element 28 with hammer blows to the lugs 62. After loosening the retainer member 28, the worker may then simply grasp the hammer lugs 62 and counter-rotate the retainer member. In this case, rotation will simply be accomplished to the point that the inner periphery of the sealing member 44 moves out of contact with the outer periphery of the pipe. When this occurs, the pipe may simply by withdrawn from the coupling and the coupling may be transported to another location for storage or reuse.

Under circumstances where temporary pipe systems are assembled by means of compression type sealing mechanisms and are retained in sealed condition for extended periods of time, the elastomeric material of the sealing members tends to adhere to metal components of the coupling structure. For example, in a case of the coupling mechanism illustrated in the drawings, upon loosening of the retainer element 28 and removal of the sealing element 44, the seal support ring member 36 may be adhered to the seal member. Thus, when the seal member is withdrawn, the seal support member 36 may be withdrawn along with it. The seal support member can become lost or it may be inadvertently discarded along with the sealing member in the event a decision is made to replace the seal member. When the coupling is subsequently reassembled, effective sealing cannot be established if the seal support member 36 is missing. To prevent inadvertent separation of the seal support member from the coupling body, the seal support member and coupling body may be so related as to establish mechanical interlocking and retention. For example, a few small tack welds may be utilized as shown at 55, thus joining the seal support member to the body structure 14 in substantially permanent manner. Of course, if it is subsequently desired to remove the track welded seal support members, the small tack welds may be simply broken. After the seal support member is replaced with another seal support member, the coupling structure may again by tack welded if desired. In another form of the invention, the seal support member 36 may be retained in assembly with the body structure 14 by means of an interference fit. This can be accomplished by simply manufacturing the external surface of the seal support member and the internal surface 34 to be of appropriate sizes for an interference fit. The interference fit may be established mechanically simply by pressing the seal support member in place within the bore 34 or, in the alternative, the parts may be assembled at differing temperatures such that the seal support member will be positively retained in assembly with the coupling body when the parts reach ambient temperature. Thus, the seal support member 36 is positively retained and there is no possibility of it being inadvertently separated from the coupling body in the event the sealing member 44 is removed.

In some cases, it is desirable to simply loosen the retainer members 28, withdraw the pipe ends 12 from the coupling without completely disassembling the coupling structure. If the sealing members 44 have become adhered to the outer periphery of the pipe by prolonged mechanical compression, this adhered relationship can be broken simply by jarring the coupling body to shift it slightly relative to the pipe structures. Of course, it is not desirable to draw the coupling by applying hammer blows to the exposed ends of the retainer elements 28. To permit efficient jarring of the coupling body, a pair of hammer lugs 70 are attached to the exterior of the coupling body on either side thereof as shown in FIG. 1. After the retainer member 28 has been loosened with counter-clockwise hammer blows, if the coupling remains seized with respect to the pipe, loosening can be achieved simply by applying hammer blows to the hammer lugs 70 in the appropriate direction for loosening. Thus, hammer blows may be applied linearly to the coupling body without, in any way, interferring with the structure or function of the retainer elements 28. Further, there is no need to apply hammer blows to the exposed ends of the coupling body after the retainer member has been completely removed from its threaded engagement at the end of the coupling.

While the foregoing is directed to the preferred embodiment of the present invention, other and further embodiments of the invention may be devised without departing from the basic concept thereof, and the scope thereof is determined by the claims which follow.

I claim:

1. A portable, reusable coupling for connecting cylindrical conduit, said coupling comprising:
(a) an elongated tubular coupling body defining a generally cylindrical internal passage of sufficient dimension to receive end portions conduit therein, said coupling body being formed to define internal shoulder means at each extremity thereof, said coupling body also having internal body threads at each extremity thereof;
(b) annular metal seal support ring means being provided within each extremity of said coupling body and having abutting relation with said internal shoulder means;
(c) seal retainer means being provided at each extremity of said coupling, each of said seal retainer means defining annular externally threaded connection rim means adapted to be received in connected adjustable relation by said internal body threads, said seal retainer means cooperating with said annular seal support ring means to define a variable volume internal seal chamber having said seal support ring means as a circular wall thereof and to define an annular variable volume internal seal locking groove, said seal retainer means further defining a curved concave circular seal support surface extending to the inner periphery of said seal retainer means and forming a seal supporting wall of said seal chamber; and
(d) annular resilient seal means being disposed within said internal seal chamber and defining a deformable annular sealing portion having a generally cylindrical inner sealing periphery for sealing engagement with end portions of conduit, said resilient seal means being of sufficient internal dimension to receive end portions of conduit therein, upon linear movement of said seal retainer means to reduce the volume of said seal chamber said sealing portion of said seal means being mechanically deformed thus forcing the inner peripheral sealing portion thereof into sealing engagement with end portions of conduit, said seal means defining a convex curved circular surface having mating engagement with said curved concave circular support surface of said seal retainer means, said seal means further defining a radailly outwardly extending circular locking flange being received within said seal locking groove, upon said linear movement of said seal retainer means said locking flange of said seal means being mechanically locked within said seal locking groove.

2. A portable, reusable coupling as recited in claim 1, wherein said coupling includes:
a plurality of hammer lugs being defined by said seal retainer means, rotational and linear movement of said seal retainer means being achieved by impact forces against said hammer lugs.

3. A portable, reusable coupling as recited in claim 1, wherein said coupling comprises:
annular enlargements being defined at said extremities of said coupling body each of said annular enlargements being formed internally to define said internal body threads and said internal shoulder means.

4. A portable, reusable coupling as recited in claim 1, wherein:
(a) said resilient seal means defines a retainer surface at one axial end thereof being an annular, generally planar outer surface circumscribing said annular seal engaging portion and said seal locking flange; and
(b) said annular metal seal support means defines a generally planar annular surface being in supporting engagement with said retainer surface.

5. A portable, reusable coupling as recited in claim 1, wherein:
said connection rim of said seal retainer means defines an annular end surface having acute angular relation with respect to the longitudinal axis of said coupling body and defining an annular seal locking lip positioned for engagement with said resilient seal means at the juncture of said sealing portion and locking flange thereof, said seal locking lip being in opposed relation with said seal support means.

6. A portable, reusable coupling as recited in claim 1, wherein:

(a) said metal seal support ring defines an annular generally planar seal support surface;

(b) said resilient seal means defines an annular retainer surface at one extremity thereof, said retainer surface being of planar configuration and defines one end surface of said locking flange, said planar retainer surface being in supported engagement with said planar seal support surface of said seal support ring; and (c) said seal support surface reacting with said annular end surface upon inward movement of said retainer member and imparting axial and radially inward components of force to said resilient seal means.

7. A portable, reusable coupling as recited in claim 6, wherein:

said connection rim of said seal retainer means defines an annular end surface having acute angular relation with respect to the longitudinal axis of said coupling body and defining an annular seal locking lip positioned for engagement with said resilient seal means at the juncture of said sealing portion and locking flange thereof, said seal locking lip being in opposed relation with said seal support means.

8. A portable, reusable coupling as recited in claim 7, wherein:

said retainer member further defines an internal annular seal support flange having one end thereof forming the inner peripheral portion of said internal seal support surface.

9. A portable, reusable coupling as recited in claim 8, wherein said coupling includes:

a plurality of hammer lugs being defined by said seal retainer means, rotational and linear movement of said seal retainer means being achieved by impact forces against said hammer lugs.

10. A portable, reusable coupling as recited in claim 1, wherein:

said seal support means and said seal retainer means are formed internally to define axial relief so as to permit substantial axial misalignment of conduit when inserted therein with respect to said coupling without interference between said coupling and inserted conduit.

11. A portable, reusable coupling as recited in claim 1, wherein:

hammer lug means is provided on the exterior of said coupling body to permit application of linear jarring forces to said coupling body.

* * * * *